United States Patent [19]
Kobayashi

[11] Patent Number: 5,365,275
[45] Date of Patent: Nov. 15, 1994

[54] METHOD AND APPARATUS FOR GENERATING PAL VIDEO SIGNAL BY DIGITAL PROCESSING

[75] Inventor: Hiroaki Kobayashi, Tokyo, Japan

[73] Assignee: Matsushita Electric Industrial Co., Ltd., Osaka, Japan

[21] Appl. No.: 900,299

[22] Filed: Jun. 18, 1992

[30] Foreign Application Priority Data

Jun. 28, 1991 [JP] Japan .................. 3-158202

[51] Int. Cl.⁵ .................. H04N 11/16; H04N 11/04
[52] U.S. Cl. .................. 348/493; 348/492; 348/642; 348/182
[58] Field of Search .................. 358/12, 13, 24, 21 R, 358/25, 165, 33; 348/493, 492, 472, 509, 517, 549, 642, 182; H04N 11/06, 9/64, 11/04, 11/16

[56] References Cited
U.S. PATENT DOCUMENTS

| | | | |
|---|---|---|---|
| 4,349,833 | 9/1982 | Clarke | 358/23 |
| 4,500,909 | 2/1985 | Machida | 358/17 |
| 4,605,953 | 8/1986 | Wilkinson et al. | 358/14 |
| 4,663,654 | 5/1987 | Morrison | 358/33 |
| 4,982,179 | 1/1991 | Ogawa et al. | 340/703 |

FOREIGN PATENT DOCUMENTS 2520178 7/1983 France .
1152892 6/1989 Japan .

*Primary Examiner*—John K. Peng
*Assistant Examiner*—A. Hill
*Attorney, Agent, or Firm*—Stevens, Davis, Miller & Mosher

[57] ABSTRACT

Disclosed is a method and apparatus for highly stably and accurately generating a PAL video signal by digital processing. The method and apparatus comprise generating a basic clock having a frequency which is $11 \times N$ times (N: an integer) as high as a horizontal synchronization frequency $F_H$, producing digital data of orthogonal color subcarriers, color difference signals and a luminance signal respectively with the timing of the basic clock, multiplying the digital data $D_{B-Y}$ $D_{R-Y}$ of the color difference signals by the digital data Dsin and Dcos of the color subcarriers respectively to obtain digital data of two kinds of modulation signals, adding the digital data $D_{Y+S}$ of the luminance signal to the digital data of the two modulation signals, and effecting digital/analog conversion of the addition to provide the PAL video signal.

2 Claims, 2 Drawing Sheets

METHOD AND APPARATUS FOR GENERATING PAL VIDEO SIGNAL BY DIGITAL PROCESSING

BACKGROUND OF THE INVENTION

This invention relates to a method preferably used in a PAL video signal generator apparatus for generating a PAL video signal by digital processing.

Many proposals for the purpose of technological developments in regard to the PAL system have been made hitherto in an effort to provide an improved PAL video signal generator apparatus capable of operation with high performance.

A prior art PAL video signal generator apparatus will be first described before describing the present invention, so that the present invention can be clearly understood. In the case of a video signal of the PAL system, the relation between its color subcarrier frequency $F_{SC}$ and its horizontal synchronization frequency $F_H$ does not have a simple integral relation between them unlike those in an NTSC system because offset frequency is 25 Hz. Because of such frequency relation, it is difficult to realize a PAL video signal generator apparatus capable of generating a PAL video signal by digital processing. Therefore, it is common practice to generate such a PAL video signal by analog processing.

In such a prior art PAL video signal generator apparatus relying on the analog processing, it has been inevitable that the apparatus becomes large in size resulting in an undesirable increase in the number of points to be adjusted, and it has been difficult for the apparatus to highly stably and accurately generate the PAL video signal.

SUMMARY OF THE INVENTION

It is an object of the present invention to provide a method and apparatus for highly stably and accurately generating such a PAL video signal by digital processing.

According to the present invention which attains the above object, a frequency which is $11 \times N$ times as high as the horizontal synchronization frequency $F_H$ of the PAL video signal is used as a basic clock, and the PAL video signal is quantized on the basis of the clock having the frequency $11 \cdot N \cdot F_H$ so as to generate the PAL video signal in a digital mode.

In the method and apparatus of the present invention, the frequency of the basic clock is selected to be $11 \cdot N \cdot F_H$, so that the amount of quantized data required for generating color subcarriers in the form of a continuous sinusoidal wave can be compressed to be stored in a memory available on the market and having a capacity that is sufficient to store these quantized data. When, for example, the value of N is $N \leq 104$, a single memory having a capacity of 64 kilobits can store these quantized data. The quantized data of the color subcarriers thus obtained change with the same timing as that of the data of the color difference signals quantized also on the basis of the clock described above. Therefore, these signals are multiplied and added in the form of the digital data so as to produce the digital data of the complete color signal. Then, the data of the luminance signal and those of the synchronizing signals are added to the data of the color signal to obtain the digital data of the PAL video signal.

DETAILED DESCRIPTION OF THE PREFERRED EMBODIMENT

An embodiment of the PAL video signal generator apparatus according to the present invention will now be described by reference to the drawings.

In a PAL video signal to which the present invention is directed, its color subcarrier frequency $F_{SC}$ and its horizontal synchronization frequency $F_H$ have the relation expressed by the following equation (1):

$$F_{SC} = (1135/4 + 1/625) F_H \qquad (1)$$
$$= (709379/2500) F_H$$

When a sinusoidal signal having the above frequency is expressed as F(t), the following equation (2) is obtained:

$$F(t) = \sin\{2\pi F_{SC} \cdot t\} \qquad (2)$$

Figure 1:
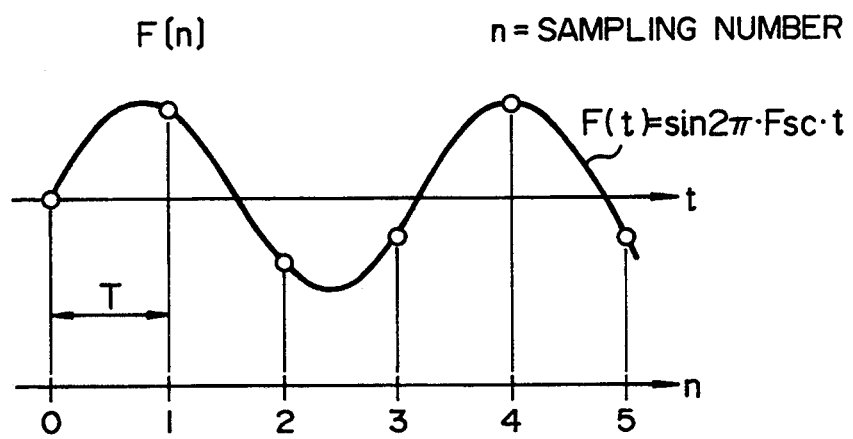
FIG. 1 is a waveform diagram illustrating the basic principle of the present invention.

The sinusoidal signal F(t) is continuous relative to time t. When the sinusoidal signal F(t) is sampled at a sampling period T, and the result is expressed as F[n], F[n] can be expressed by the following equation (3):

$$F[n] = \sin\{2\pi F_{SC} \cdot nT\} \qquad (3)$$
$$= \sin\{2\pi(709379/2500) F_H \cdot nT\}$$

where n is the sampling number. FIG. 1 is a graph showing the relation between F(t) and F[n]. In FIG. 1, the sampled values F[n] relative to the sampling number n are indicated by round marks ◯.

When now the sampling frequency for F(t) is selected to be M times (M: an integer) as high as the horizontal synchronization frequency $F_H$, the sampling period T is expressed by the following equation (4):

$$T = 1/(M F_H) = (1/M) T_H \qquad (4)$$

where $T_H = 1/F_H$. From the equations (3) and (4), F[n] is expressed by the following equation (5):

$$F[n] = \sin\{2\pi(709,379/2500)(1/T_H)n(T_H/M)\} \qquad (5)$$
$$= \sin\{2\pi(709,379/2500)n/M\}$$

The sampling frequency M $F_H$ is required to be a frequency higher by two or more times than the color subcarrier frequency $F_{SC}$. When the value of M is selected to be an integer satisfying the above condition, the number of the sampled data F[n] required so that the sinusoidal signal F(t) having the frequency $F_{SC}$ can be maintained continuous is $2500 \times M$ according to the equation (5). Noting the fact that the greatest common divisor of the value 709,379 in the equation (5) is 11, F[n] can now be expressed as follows:

$$F[n] = \sin\{2\pi(64,489 \times 11/2500)n/M\} \qquad (6)$$

Therefore, when the value of M is selected to be $11 \times N$ (N: an integer), F[n] is now given by the following equation (7):

$$F[n] = \sin\{2\pi(64,489/2500)n/N\} \quad (7)$$

According to the present invention, all of the color signal, luminance signal and synchronizing signals constituting the PAL video signal are generated on the basis of the same clock having the frequency $11 \cdot N \cdot F_H$. Thus, when the bandwidth occupied by the PAL video signal is 6 MHz, the value of the clock frequency $11 \cdot N \cdot F_H$ is required to be higher than 12 MHz which is two times as high as the bandwidth occupied by the PAL video signal. In view of the above condition, the required value of N is given by the following expression (8):

$$11 \cdot N \cdot F_H \geq 12 \text{ MHz} \quad (8)$$

Therefore, the value of N is expressed as follows:

$$N \geq 70 \quad (9)$$

The present invention will now be described by reference to FIG. 2 in which the value of N is set at 80. Thus, when N=80, the value of the clock frequency is $880 F_H$. In this case, the amount of the sampled data F[n] required to maintain continuous the sinusoidal signal F(t) is $2500 \times N = 200,000$. When a clock having a frequency $M F_H$, for example, a clock having a frequency $879 F_H$ which is close to the clock frequency $880 F_H$ but which is not equal to $11 \cdot N \cdot F_H$ is used in lieu of the clock frequency $880 F_H$, the amount of the sampled data F[n] required to maintain continuous the sinusoidal signal F(t) is $2500 \times 879 = 2,197,500$. This amount corresponds to about 11 times as much as that required when the clock frequency $880 F_H$ is used.

The above discussion teaches that, when the basic clock frequency is selected to be an integer times as high as 11 $F_H$ where $F_H$ is the horizontal synchronization frequency, the amount of sampled data required to generate the sinusoidal signal F(t), that is, the color subcarrier, can be compressed to about 1/11 of that required when the basic clock frequency has any other values.

For the storage of the 200,000 sampled data described above, a plurality of memories, for example, four memories each having a capacity of 64 kilobits are required. However, it will be apparent from FIG. 2 that, when the symmetry of the data is noted, the amount of data to be stored is only 50,001 data corresponding to the relation $0 \leq n \leq 50,000$ where n is the sampling number. Such an amount can be sufficiently stored in a single memory having a capacity of 64 kilobits.

Figure 2:
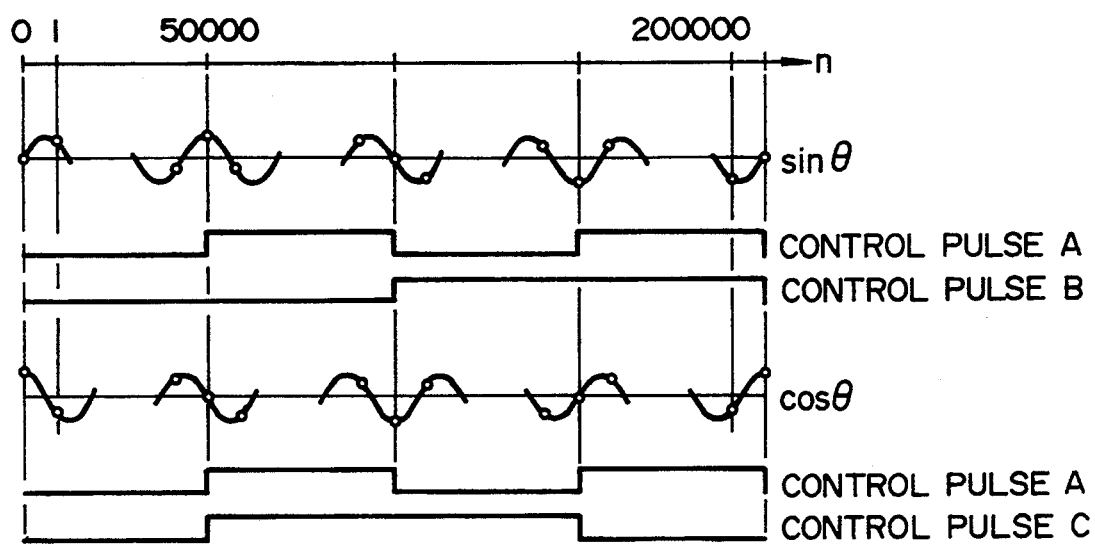
FIG. 2 is a timing chart illustrating the basic principle of the present invention.

A control pulse signal A as shown in FIG. 2 is used for reading out the 50,001 data from the memory. The operation of a memory read counter is controlled so that the counter counts up in each low level period of the control pulse signal A, while the counter counts down in each high level period of the control pulse signal A. Further, the polarity of the data read out from the memory is inverted only when control pulse signals B and C are in their high level. By so controlling, continuous sine and cosine digital data can be generated. Thus, two color subcarriers orthogonal to each other can be generated.

Figure 3:
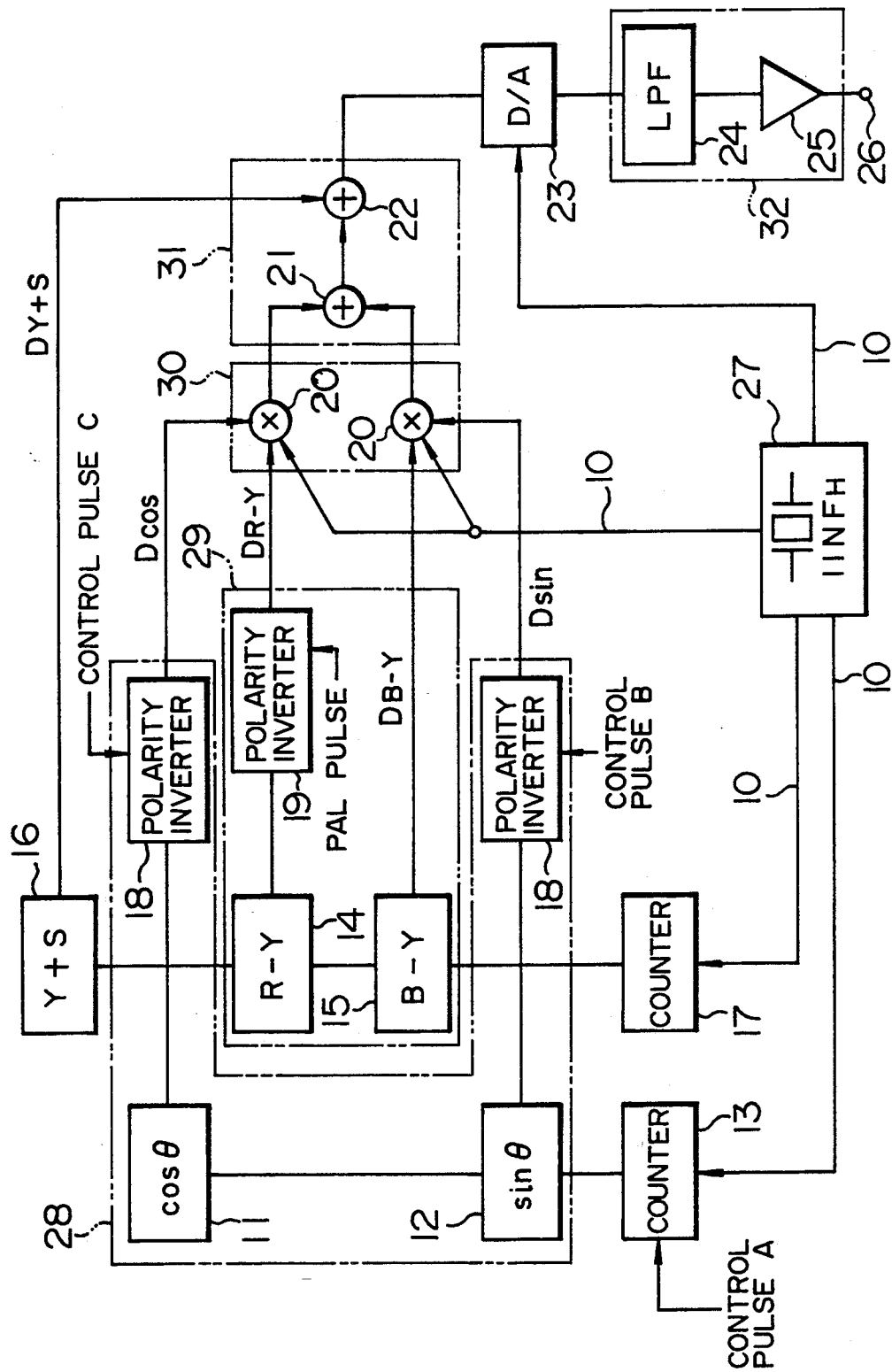
FIG. 3 is a block diagram showing the structure of an embodiment of the PAL video signal generator apparatus according to the present invention.

FIG. 3 is a block diagram showing the structure of an embodiment of the PAL video signal generator apparatus of the present invention using the color subcarrier generating method described above. Referring to FIG. 3, a clock 10, that is, the basic clock having the frequency $11 \cdot N \cdot F_H$ used for realizing the concept of the present invention, is stably generated from an oscillator, for example, a crystal oscillator 27. Memories 11 and 12 store digital data obtained when the two color subcarriers orthogonal to each other are quantized with the timing of the clock 10. The digital data stored in the memories 11 and 12 are sequentially read out by an updown counter 13 with the timing of the clock 10. Memories 14 and 15 store digital data obtained by quantizing the color difference signals R-Y and B-Y with the timing of the clock 10 respectively. A memory 16 stores digital data obtained by quantizing the luminance signal (including the synchronizing signal) with the timing of the clock 10. A counter 17 is used to read out the data from the memories 14, 15 and 16 with the timing of the clock 10. Polarity inverter circuits 18 invert the polarity of the data outputted from the memories 11 and 12 in response to the application of the control pulses C and B respectively. In response to the application of a PAL pulse signal, a polarity inverter circuit 19 inverts the polarity of the data outputted from the memory 14. Digital multipliers 20 operate with the timing of the clock 10. The apparatus further includes adders 21, 22, a D/A converter 23, a low-pass filter 24, a buffer 25 and a video signal output terminal 26.

The relation between the components of the apparatus and their operation will now be described. The updown counter 13 operating with the timing of the clock 10 orderly repeats its upcounting and downcounting operation under control of the first control pulse signal A shown in FIG. 2. The polarity of the data thus read out from the memories 11 and 12 is inverted by the respective polarity inverter circuits 18 in the high level period only of the second control pulse signals B and C shown in FIG. 2. As a result, data Dcos and Dsin of the two color subcarriers orthogonal to each other appear as outputs of the respective polarity inverter circuits 18. By the function of the counter 17 making its counting operation with the timing of the clock 10, color difference signal data each corresponding to one line are sequentially outputted from the memories 14 and 15. The polarity of the data read out from the memory 14 is inverted in alternate lines by the polarity inverter circuit 19 inverting the data polarity in response to the application of the PAL pulse to provide data $D_{R-Y}$ of the regular color difference signal R-Y. On the other hand, the data outputted from the memory 15 directly provide data $D_{B-Y}$ of the regular color difference signal B-Y.

Then, with the timing of the clock 10, one of the digital multipliers 20 multiplies the color difference signal data $D_{R-Y}$ by the color subcarrier data Dcos, while the other digital multiplier 20 multiplies the color difference signal data $D_{B-Y}$ by the color sub-carrier data Dsin, and the adder 21 adds these results of multiplication to provide its output given by $D_{R-Y} \times Dcos + D_{B-Y} \times Dsin$. Then, when the one-line luminance signal data $D_{Y+S}$ read out from the memory 16 by the counter 17 is added in the adder 22 to the output of the adder 21, the complete digital data of the PAL video signal appears at the output of the adder 22.

Then, when the digital data output of the adder 22 is converted by the D/A converter 23 into the corresponding analog signal with the timing of the clock 10, and the analog signal is passed through the low-pass filter 24 and the buffer 25, the PAL video signal can be stably derived from the video signal output terminal 26.

It is apparent that a plurality of video signals can be derived from the output terminal 26 of the illustrated embodiment when various data to be stored in the memories 14 to 16 are prepared.

Therefore, according to the present invention, the color subcarrier signals having an entirely asynchronous relation between them with respect to the line period are sampled with the timing of a clock synchronous with the line period, so that such quantized data can be generated as fixed data. In this case, the value of the clock is selected to be $11 \cdot N \cdot F_H$, that is, the frequency obtained by multiplying the horizontal synchronization frequency $F_H$ by a constant $11 \cdot N$ where N is an integer. By so selecting the value of the clock, the amount of the fixed data to be stored can be compressed to about 1/11, so that the data can be stored in a memory having a capacity preferable from both the aspect of cost and the aspect of circuit scale. Further, because the quantized data of the luminance signal, the synchronizing signal and the two color difference signals can be easily generated, the digital data of the PAL video signal can be completely produced, so that the PAL video signal can be generated with high stability and high accuracy.

Also, because the value of N can be freely selected as desired, the frequency of the basic clock $11 \cdot N \cdot F_H$ can be selected to be suitable for each of a plurality of video signal generator apparatuses.

I claim:

1. An apparatus for generating a PAL video signal by digital processing comprising:
   means for generating digital data Dsin and Dcos of orthogonal color subcarriers by quantization with the timing of a basic clock frequency ($11 \cdot N \cdot F_H$ where N is an integer);
   means for generating digital data $D_{B-Y}$ and $D_{R-Y}$ of respective color difference signals B-Y and R-Y by quantization with the timing of said basic clock;
   means for generating digital data $D_{Y+S}$ of a luminance signal by quantization with the timing of said basic clock;
   first multiplier means for multiplying said digital data $D_{B-Y}$ of the color difference signal B-Y by said digital data Dsin of the color subcarrier to obtain digital data of a B-Y modulation signal;
   second multiplier means for multiplying said digital data $D_{R-Y}$ of the color difference signal R-Y by said digital data Dcos of the color subcarrier to obtain digital data of an R-Y modulation signal;
   first adder means for adding said digital data of the B-Y modulation signal and said digital data of the R-Y modulation signal;
   second adder means for adding said digital data $D_{Y+S}$ of the luminance signal to the result of addition by said first adder means; and
   digital/analog conversion means for effecting digital/analog conversion of the result of addition by said second adder means.

2. An apparatus for generating a PAL video signal by digital processing comprising:
   means for generating a basic clock having a frequency which is $11 \times N$ times (N: an integer) as high as a horizontal synchronization frequency $F_H$;
   means for generating digital data Dsin and Dcos of orthogonal color subcarriers quantized with the quantization timing of said basic clock;
   means for generating digital data $D_{B-Y}$ and $D_{R-Y}$ of respective color difference signals B-Y and R-Y quantized with the quantization timing of said basic clock;
   means for generating digital data $D_{Y+S}$ of a luminance signal quantized with the quantization timing of said basic clock;
   means for multiplying said digital data $D_{B-Y}$ by said digital data Dsin and said digital data $D_{R-Y}$ by said digital data Dcos to obtain digital data of a B-Y modulation signal and digital data of an R-Y modulation signal respectively;
   means for adding said digital data of the B-Y modulation signal, said digital data of the R-Y modulation signal and said digital data $D_{Y+S}$ of the luminance signal; and
   digital/analog conversion means for effecting digital/analog conversion of the result of addition by said adder means.

* * * * *